United States Patent [19]

Wicke

[11] 4,194,524
[45] Mar. 25, 1980

[54] VALVE CHAMBER FLUSHING SYSTEM

[75] Inventor: Charles H. Wicke, Richmond, Tex.

[73] Assignee: ACF Industries, Incorporated, New York, N.Y.

[21] Appl. No.: 908,413

[22] Filed: May 22, 1978

[51] Int. Cl.² .................... F16K 31/163; F16K 51/00
[52] U.S. Cl. ........................... 137/240; 137/614.11; 137/624.2; 137/637
[58] Field of Search ................ 137/15, 237, 238, 240

[56] References Cited

U.S. PATENT DOCUMENTS

| | | | |
|---|---|---|---|
| 934,614 | 9/1909 | Huxley | 137/238 X |
| 1,683,372 | 9/1928 | Plantinga | 137/237 |
| 2,584,083 | 1/1952 | Mellett | 137/238 |
| 2,664,338 | 12/1953 | Cornell | 137/240 X |
| 3,605,789 | 9/1971 | Graham | 137/240 |

Primary Examiner—Martin P. Schwadron
Assistant Examiner—Richard Gerard
Attorney, Agent, or Firm—Eugene N. Riddle

[57] ABSTRACT

A system to flush the valve chamber of a valve (10) which is mounted in a flowline (12) by passing a cleaning fluid through the valve chamber when the valve is moved between open and closed positions. An actuator (38) operates a pair of flush valves (26, 32) which are connected to the valve body (14) for controlling the flow of the flushing fluid through the valve body. A flush control system is operated by movement of the flowline valve between the open and closed positions. The flush control system is connected to the actuator and operated when the flowline valve is moved from the open position to the closed position. The flush control system causes an operating fluid to be applied to the flush valve actuator so that the flush valves are opened to pass the flush or cleaning fluid through the valve chamber and then after a period of time again sequence the valve actuator to close the flush valves and terminate the cleaning of the valve chamber.

10 Claims, 2 Drawing Figures

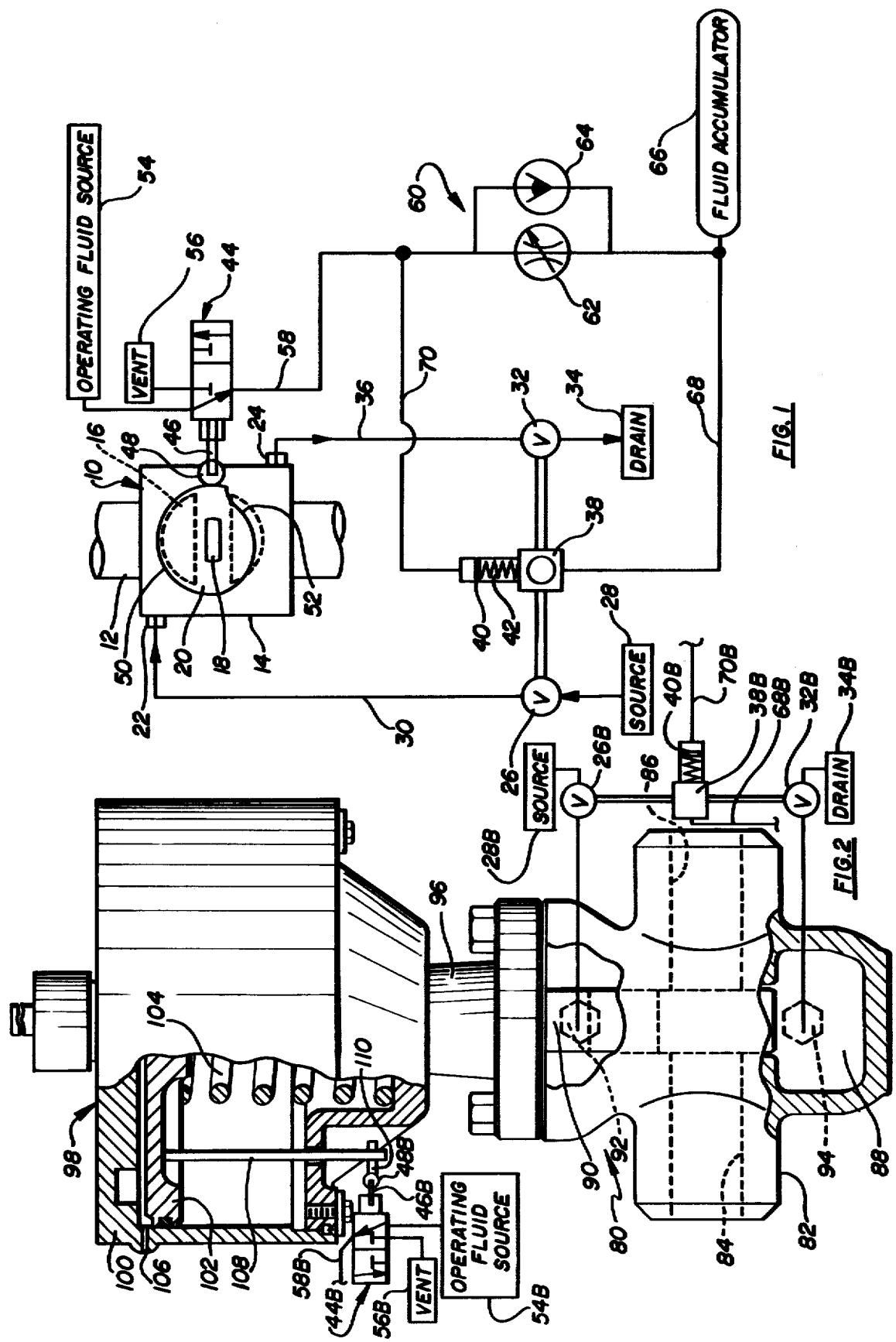

VALVE CHAMBER FLUSHING SYSTEM

BACKGROUND OF THE INVENTION

This invention is related to a cleaning system to clean the valve chamber of a valve that is connected in a lading carrying network. The invention is related to a system which accomplishes the function of cleaning the valve chamber of a valve when the valve is moved from the open position to the closed position.

In regard to the prior art of cleaning valve chambers, the known devices are only manually operable and basic at the best. The Mellett U.S. Pat. No. 2,584,083 dated Jan. 29, 1952 discloses a valve chamber with an auxiliary inlet, an auxiliary outlet, and a valve chamber drain so that a person can manually operate valves in flowlines connected to these auxiliary ports to fill and drain the valve chamber. The Moran et al U.S. Pat. No. 1,941,443 issued Dec. 26, 1933 is even more basic in that it provides an auxiliary fluid passageway from the upstream side of a flow-line connected to the valve into the bottom of the valve chamber so that in the open position of the valve additional fluid can be passed into the valve chamber to dislodge sediment, scale, and so forth which may accumulate within the valve. In equipment designed for handling of foodstuffs and liquids for human consumption, it is often necessary to flush the system which contains such material if the system is to remain idle for some time in order to avoid stagnation and contamination. One example of such a system is a beer dispensing system in a tavern which has one or more remote outlets spaced a distance from a common keg of beer. When the system is to remain idle for some time, the beer is flushed from the lines by various inlets and outlets to the system and water is passed through the flowlines normally occupied by the beer.

SUMMARY OF THE INVENTION

The valve flushing system of this invention includes a flush control valve which is mechanically connected to the flowline valve that is to be flushed. This flush control valve is in fluid communication with the pressurized source of operating fluid. A pair of flush valves are each in separate fluid communication with an auxiliary inlet and an auxiliary outlet on the flowline valve. Both of the flush valves are operated simultaneously by one valve actuator. The flush control valve is operably connected to the flowline or lading carrying valve and in fluid communication with the actuator so that as the flowline valve is moved from the open position to the closed position the flush valves are opened temporarily to permit a fluid flow through the valve chamber of the flowline valve for a limited time.

One object of this invention is to provide a system for flushing the valve chamber of a valve in a lading handling system where the valve chamber must be flushed when the valve is moved to the closed position.

Still one other object of this invention is to provide a system for flushing the valve chamber of a rotating valve such as a ball valve and a valve with linear motion such as a gate valve.

Various other objects, advantages, and feature of this invention wil become apparent to those skilled in the art from the following discussion, taken in conjunction with the accompanying drawing, in which:

DESCRIPTION OF THE DRAWING

FIG. 1 is a schematic diagram illustrating a flowline valve in a lading carrying system and operably connected with the valve chamber flushing system of this invention wherein the flowline valve is in the closed position; and FIG. 2 is a partially cutaway elevation view of a gate valve and actuator therefor which is equipped with a flush control valve that is operable with the system of this invention.

The following is a discussion and description of preferred specific embodiments of the valve chamber flushing system of this invention, such being made with reference to the drawing, whereupon the same reference numerals are used to indicate the same or similar parts and/or structure. It is to be understood that such discussion and description is not to unduly limit the scope of the invention.

DETAILED DESCRIPTION

Referring to FIG. 1 such shows a top view of a flow-line valve and a portion of a lading carrying system and the valve flushing system in diagrammatic form. The flowline valve which carries the lading as indicated generally at 10 is mounted in a flowline or lading carrying conduit 12. Flowline valve 10 is a ball valve and includes a valve body 14 having a valve chamber to receive and rotatably mount a ball valve member 16. A valve stem 18 extends through valve body 14 and is engaged with ball valve member 16 inside the valve body. A cam 20 is mounted with valve stem 18 on the exterior of the valve. Cam 20 is used for operating a flush control valve. Valve 10 is opened and closed by rotating valve stem 18 by either a handle or a suitable valve actuator. Valve body 14 is provided with an auxiliary inlet 22 and an auxiliary outlet 24 which are in fluid communication with the valve chamber and are used to pass the flush fluid through the valve chamber.

The portion of this system which controls the passage of flush fluid through the valve chamber includes an inlet flush valve 26 that is in fluid communication with a source of flush fluid 28 and also connected by a fluid line 30 to the valve body auxiliary inlet 22. Another flush valve 32 is in fluid communication with a drain or suitable dump reservoir 34 and also connected by a flowline 36 with valve body auxiliary outlet port 24. Flush valves 26 and 32 are both mounted with the same flush valve actuator so the valves can be opened and closed simultaneously. Flush valve actuator 38 is a type of mechanical valve actuator which uses fluid to displace a piston 40 mounted in a cylinder in order to rotate the output shaft thereof to open the valves. This actuator 38 has a spring 42 to return piston 40 and rotate the output shaft to close the valves. Additionally, this particular actuator is constructed to be fluid assisted in the return mode of operation so that fluid pressure can be applied to piston 40 to assist the spring 42. Flush actuator 38 has a single output shaft which extends through the actuator with the oppposite ends thereof operably connected to flush valves 26 and 32.

The portion of this flush system which controls operation of actuator 38 in sequence with the position of flowline valve 10 comprises a flush control valve indicated generally at 44. Flush control valve 44 is a three-way valve which has a plunger or valve stem 46 thereof attached to a cam follower 48. Flush control valve 44 is mounted on a suitable support structure adjacent flowline valve 10 such that cam follower 48 will contact a peripheral contact surface 50 of cam 20 and follow it upon rotation of the cam in conjunction with rotation of flowline valve stem 18. Cam surface 50 has a recessed portion 2 which enables flush control valve stem 46 to move to an extended position as cam follower 48 moves into this recessed portion 52. Recessed portion 52 is arranged to contact cam follower 48 when flowline valve 10 is in the open position. Flush control valve stem 46 is in a retracted position when cam follower 48 is located on cam surface 50 that is not recessed and this occurs when flowline valve 10 is in the closed position. Flush control valve 44 has the inlet thereof connected to a pressurized operating fluid source 54 such as pressurized air or pressurized hydraulic fluid. One outlet of flush control valve 44 is connected to a vent 56 which can be a suitable discharge to atmosphere or, if hydraulic fluid is used, a suitable reservoir. The other connection of flush control valve 44 is joined by a fluid line 58 to the piston side of flush actuator 38 and to a flush timing control indicated generally at 60.

Flush time control 60 includes a throttling valve 62 and a check valve 64 which regulate the operating fluid flow into a fluid accumulator 66 and into the spring side of valve actuator 38. Throttling valve 62 is preferably an adjustable orifice valve which can be used to vary the flow rate from flushing control valve 44 into fluid accumulator 66 and flush valve actuator 38. Check valve 64 is connected in a parallel relation to throttling valve 62 and arranged to block fluid flow from flush control valve 44 yet permit fluid flow in the reverse direction from fluid accumulator 66. A fluid line 68 connects the juncture of flush timing control 60 and fluid accumulator 66 to the spring side of flush valve actuator piston 40 which will permit the operating fluid to assist actuator spring 42 on return motion of the actuator. Another fluid line 70 connects flush timing control 60 at fluid line 58 to the piston side of flush valve actuator 38. Fluid accumulator 66 can be a tank when the system is operating with air and the like and it can be a suitable hydraulic accumulator when the system is operating with a liquid fluid. Fluid accumulator 66 functions to receive and temporarily store a quantity of the pressurized operating fluid during the flushing operation of the system.

When flowline valve 10 is in its open position, ball valve member 16 permits fluid flow through the lading carrying conduit 12 and flush control valve 44 is positioned in the alternate position from that shown in FIG. 1 such that no pressurized operating fluid is present in the control portion of the system and flush valves 26 and 32 are closed. Once flowline valve 10 is moved from the open position to the closed position, then flush control valve 44 is shifted to the position shown in FIG. 1 and the system is set into operation.

For purposes of the discussion here, it will be assumed that the operating fluid is pressurized air, however, it should be understood that a liquid fluid can also be used. Air from operating fluid source 54 passes through flush control valve 44 and is applied to valve actuator piston 40 in opposition to spring 42 which displaces the piston, rotates the actuator shaft, and causes flush valves 26 and 32 to be opened. At the same time the pressurized air passes through throttling valve 62 into fluid accumulator and to the spring side of actuator piston 40. The air pressure in fluid accumulator 66 and flowline 68 is at a lower pressure than air in flowline 70 because of the presence of throttling valve 62 in that portion of the circuit. Initially, this pressure differential is a maximum because the preexisting pressure in the system is substantially less than the pressure of the air from operating fluid source 54. Throttling valve 62 reduces the flow rate of the air into fluid accumulator 66 and flowline 68, however, the pressure in these two portions of the system will increase and after a period of time will be equal to the air pressure in flowline 70. When this equal pressure condition occurs, actuator piston 40 is subjected to equal fluid pressure on both sides thereof. Therefore, actuator spring 42 returns the actuator to its normally closed position which in turn closes flush valves 26 and 32. As long as flowline valve 10 remains in the closed position, the air in the system is at the pressure supplied by operating fluid source 54 and flush valves 26 and 32 remain closed.

When flowline valve 10 is moved from the closed position to the open position, flush control valve 44 is displaced to the alternate position from that shown. At this time the air which is contained in flowline 58, 70, 68, and in fluid accumulator 66 is vented through flush control valve 44 to vent 56. When this occurs check valve 64 opens and allows unrestricted flow from fluid accumulator 66 into flowline 58 which dumps the pressurized fluid from the system yet does not cause flush valve actuator 38 to be operated. Flush valve actuator 38 is not operated because fluid pressure on opposed sides of actuator piston 40 is generally equalized and actuator spring 42 keeps actuator piston 40 in fixed position. As long as flush control valve 44 is in this position, fluid pressure in flowlines 58, 70, and 68 and in fluid accumulator 66 remains substantially that of the vent pressure.

When flush valves 26 and 32 are open a suitable flushing fluid is passed from flush fluid source 28 through flush valve 26 and flush conduit 30 into the valve body auxiliary inlet port 22. Flush fluid coming from valve body 14 exits through auxiliary outlet port 24 and passes through flush fluid conduit 36 and flush valve 32 into drain 34. The particular lading which is carried by flowline valve 10 determines the specific type of flush fluid employed so that the valve body is sufficiently cleaned. The length of time in which the flush fluid passes through valve body 14 depends upon the length of time it takes the operating fluid to reach the equal pressure condition across flush valve actuator piston 40 and for the actuator to close flush valves 26 and 32. This time period can be varied by adjusting the variable orifice throttling valve 62 when the system is in use. Also, the time period is in part determined by selecting the volumetric size of fluid accumulator 66 upon the initial design so it will function cooperatively with throttling valve 62 to give the required flush time period. In determining the flush time period, the pressure of the operating fluid supplied by source 54 must be considered as well as whether the operating fluid is gaseous or liquid. The system as shown will function equally well given the proper selection of specific elements regardless of whether the operating fluid is liquid or gaseous.

FIG. 2 illustrates another embodiment of this invention as applied to a gate valve. Gate valve 80 includes a valve body 82 with inlet and outlet flow passageways 84 and 86 and a valve chamber 88 therebetween. A gate valve member 90 is movably mounted in valve chamber 88 for movement between open and closed positions. Valve body 82 has an auxiliary inlet 92 and an auxiliary outlet 94 which are used to provide fluid communication from the exterior of the valve to the valve chamber in order to pass the flushed fluid through the valve body. A valve bonnet 96 is mounted on the upper portion of valve body 82 and encloses the stem (not shown) which is attached to gate valve member 90 for movement of the gate valve member. An actuator indicated at 98 is mounted with bonnet 96 and secured to the valve stem. Actuator 98 includes a housing 100 which encloses a piston 102 and one side of the housing to bias the piston to an upper end of the housing and the valve stem to an extended position. A fluid inlet port 106 through the side of actuator housing 100 is used to inject fluid under pressure into actuator 98 for displacing piston 102 downward in opposition to spring 104 for opening gate valve 80. Position indicator 108 extends through an opening in the lower portion of actuator housing 100 and has a block 110 secured to the end portion thereof which is always outside of actuator housing 100.

The flushing system of this invention as applied to the gate valve and actuator as shown in FIG. 2 includes the same basic components as described above, with the exception of the cam which in this embodiment is replaced by the position indicator 108 and block 110. The portions of the system shown in FIG. 2 which are the same as portions of the system shown in FIG. 1 have the same identifying number followed by the letter "B". FIG. 2 shows only a portion of the entire flushing system and only the portions which are directly connected to the gate valve and actuator 98. Other portions of this system are the same as that shown in FIG. 1, however, they have been omitted to avoid undue repetition. However, it is to be understood that they are connected to the portions of the system shown in FIG. 2. In the operation of the gate valve embodiment of this invention, flush control valve 44B is positioned as shown when gate valve 80 is closed. At this time position indicator 108 contacts cam follower 48B and displaces flush control valve stem 46B inward so operating fluid source 54B is connected to lines 58B, 70B and supplies operating fluid to flush valve actuator 38B. Flush valves 26B and 32B are closed because fluid pressure is equalized across actuator piston 40B. When valve actuator 98 is operated to open gate valve 80, actuator supply fluid enters actuator housing 100 through port 106 and displaces actuator piston 102 downward against the bias of actuator spring 104 which in turn moves gate valve member 90 to open position and permits fluid flow of the lading through gate valve passageways 84 and 86. Also, at this time flush control valve 44B is moved from the position shown to its alternate position which connects vent 56B with fluid line 58B and vents the pressurized operating fluid from the system. Once actuator 98 is again operated to close gate valve 80 the fluid within actuator housing 100 is vented through port 106 and spring 104 moves gate valve member 90 to the closed position as shown thereby blocking passage of the lading through the gate valve passageways. At this time block 110 on position indicator 108 contacts flush control valve 44B returning it to the position shown in FIG. 2 which applies operating fluid from source 54B into the system through line 58B. Applying the operating fluid pressure at this time sequences flush valve actuator 38B to temporarily open and close flush valves 26B and 32B in order to clean the valve chamber 88 in the same manner as described above.

What is claimed is:

1. A system to flush the valve body of a lading carrying valve in a lading handling network which must have the valve chamber thereof flushed when the valve is moved between open and closed positions, comprising:
   an auxiliary inlet and outlet to said valve body through which a flushing fluid can pass through said valve body;
   a pair of flush valves each in separate fluid communication with said auxiliary inlet and said auxiliary outlet, one of said flush valves being in fluid communication with a source of flush fluid and the other of the flush valves being in fluid communication with a suitable drain;
   a valve actuator operably connected to said flush valves to open and close them; and
   a flush valve control means operably connected to said lading carrying valve and in fluid communication with said valve actuator, said flush valve control means being actuated by said lading carrying valve upon movement of said lading carrying valve between said open and closed positions in order to sequence said valve actuator to open said flush valves in order to pass a flush fluid from said source through said valve chamber to said drain for flushing said valve chamber and to close said flush valves after a predetermined period of time to stop flow of said flush fluid through said valve chamber.

2. The system of claim 1 wherein:
   said flush valve control means has a flush time control means operable to regulate the time period in which said flush valves are open to pass flush fluid from said source; and
   said valve actuator has both of said flush valves mounted therewith for simultaneous opening and closing of said flush valves.

3. The system of claim 2 wherein:
   said flush valve control means has a three-way control valve operably connected to said lading carrying valve to be displaced between first and second positions by the movement of said lading carrying valve between said open and closed positions;
   said three-way control valve in said first position being operable to vent operating fluid from said valve actuator and said flush valve control means, and said three-way control valve in said second position being operable to pass a pressurized operating fluid from an operating fluid source to said valve actuator and said flush time control means in order to operate said flush valve actuator.

4. The system of claim 1 wherein:
   said lading carrying valve is a ball valve having a stem extending therefrom which rotates with the ball valve member thereof and a cam is mounted on said stem to provide an operable signal for said flush valve control means;
   said flush valve control means has a three-way control valve operably mounted with said lading carrying valve such that the stem of said threeway control valve is displaced by a cam follower that is moved by said cam on said lading carrying valve; and
   said flush control means has a flush time control means in operable fluid communication with said three-way valve and operable to regulate the time period in which said flush valves are open.

5. In a lading handling network that has a lading carrying valve which must have the valve chamber thereof flushed when the lading carrying valve is in a closed position, an improvement comprising a system to flush the valve chamber of the lading carrying valve when it is moved between the open and closed positions, comprising:
- an auxiliary inlet and outlet to said valve body by which a flushing fluid can pass through said valve chamber;
- a pair of flush valves each in separate fluid communication with said auxiliary inlet and said auxiliary outlet, one of said flush valves being in fluid communication with a source of flush fluid and the other of the flush valves being in fluid communication with a suitable drain;
- a single actuator operably connected to both of said flush valves to open and close them simultaneously, said actuator being fluid operated to open said flush valves, and spring urged, as well as fluid assisted to close said flush valves;
- a flush valve control means operably connected to said lading carrying valve and in fluid communication with said actuator, said flush valve control means being actuated by said lading carrying valve upon movement of said lading carrying valve between open and closed positions in order to sequence said flush valve control means for applying an operating fluid under pressure to said actuator for operating said actuator to open said flush valves in order that a flush fluid from said source can pass through said valve chamber to said drain for flushing said valve chamber; and
- differential pressure means in fluid communication with said actuator and said flush valve control means effective to permit a differential fluid pressure across said actuator initially after operating said flush valve control means to open said flush valves and effective to reduce the amount of the differential pressure across said actuator during a time period immediately thereafter until there is no differential fluid pressure across said actuator in order that said actuator can be operated by the spring thereof to close said flush valves and terminate flush fluid flow through said lading carrying valve.

6. A system to flush the valve body of a lading carrying valve in a lading handling network which must have the valve chamber thereof flushed when the valve is moved between the open and closed positions, comprising:
- a flush fluid line and a separate operating fluid line;
- said flush fluid line having an auxiliary inlet and outlet to said valve chamber through which a flushing fluid can pass through said valve chamber;
- a pair of flush valves in the flush fluid line each in separate fluid communication with said auxiliary inlet and said auxiliary outlet, one of said flush valves being in fluid communication with a source of flush fluid and the other of the flush valves being in fluid communication with a suitable drain;
- a valve actuator operably connected to said flush valves to open and close them and being responsive to operating fluid in the operating fluid line;
- and an actuator control valve in the operating fluid line operatively connected to said lading carrying valve and responsive to the movement of said lading carrying valve between open and closed positions;
- said control valve upon movement of the lading carrying valve from an open position to a closed position being moved to a position to effect actuation of said valve actuator for opening of the flush valves for passing a flush fluid from said source through the auxiliary inlet to the valve body and from the auxiliary outlet to said drain for flushing said valve chamber.

7. A system as defined in claim 6 wherein a flush time control means is provided in the operating fluid line to limit the time period in which said flush valves are open to pass flush fluid from said source.

8. A system as defined in claim 7 wherein said valve actuator has a piston exposed on one side to fluid pressure from the operating fluid line, and a spring on the other side of the piston urging the piston in opposition to the operating fluid pressure;
- said flush time control means includes a throttling valve and a check valve joined in parallel in the operating fluid line, one port of the throttling valve being in fluid communication with one side of the piston and another port of the throttling valve being in fluid communication with the opposite side of the piston.

9. A fluid flushing arrangement to flush the valve chamber of a main flowline valve when the valve is moved between open and closed positions, comprising:
- a flush fluid line system and a separate operating fluid line system;
- said flush fluid system having an auxiliary inlet and outlet to said valve chamber through which a flushing fluid can pass through said valve chamber;
- a pair of flush valves in the flush fluid system each in separate fluid communication with said auxiliary inlet and said auxiliary outlet, one of said flush valves being in fluid communication with a source of flush fluid and the other of the flush valves being in fluid communication with a suitable drain;
- a valve actuator operably connected to said flush valves to open and close them and responsive to operating fluid in the operating fluid line system;
- a control valve in the operating fluid line system operatively connected to said lading carrying valve and responsive to the movement of said lading carrying valve between open and closed positions;
- said control valve upon movement of the lading carrying valve from an open position to a closed position being moved to a position to effect actuation of the valve actuator for opening of the flush valves for passing a flush fluid from said source through the auxiliary inlet to the valve chamber from the auxiliary outlet to said drain for flushing said valve chamber; and
- flush time control means in the operating fluid line system to limit the time period in which the flush valves are open to pass flush fluid from said source after closing of the main flowline valve.

10. A fluid flushing arrangement as set forth in claim 9 wherein:
- said valve actuator has a piston urged to one position by a spring and urged to another position by operating fluid pressure applied to the piston in opposition to the spring;
- said flush time control means has a throttling valve and a check valve joined in parallel with one port of said throttling valve being in fluid communication with one side of said piston in opposition to said spring and another port of said throttling valve being in fluid communication with the other side of said piston to assist said spring; and
- said flush time control means has a fluid accumulator in the operating fluid line system between said piston and said other port of said throttling valve.

* * * * *